E. ANTONUCCI.
ARTIFICIAL FLOWER.
APPLICATION FILED OCT. 22, 1909.

970,413. Patented Sept. 13, 1910.

Witnesses.
L. M. Sangster.
George A. Neubauer.

Eugene Antonucci. Inventor.

By. A. J. Sangster Attorney.

UNITED STATES PATENT OFFICE.

EUGENE ANTONUCCI, OF BUFFALO, NEW YORK, ASSIGNOR TO MILLINERY AND DECORATING SUPPLY COMPANY, OF BUFFALO, NEW YORK, A CORPORATION OF NEW YORK.

ARTIFICIAL FLOWER.

970,413.     Specification of Letters Patent.     Patented Sept. 13, 1910.

Application filed October 22, 1909.   Serial No. 524,037.

*To all whom it may concern:*

Be it known that I, EUGENE ANTONUCCI, a citizen of the United States, residing at Buffalo, in the county of Erie and State of New York, have invented a certain new and useful Improvement in Artificial Flowers, of which the following is a specification.

This invention relates to improvements in artificial leaves and flowers and principally to the mode of making the same.

The principal object of the invention is to simplify and cheapen the construction of artificial leaves and flowers. To attain this end light thin, very flexible and cheap material such as velveteen is utilized which is stiffened by a backing such as tissue paper secured thereto by starch paste or the like.

The invention also relates to certain details which will be hereinafter described and claimed reference being had to the accompanying drawings, in which:—

Figure 1:
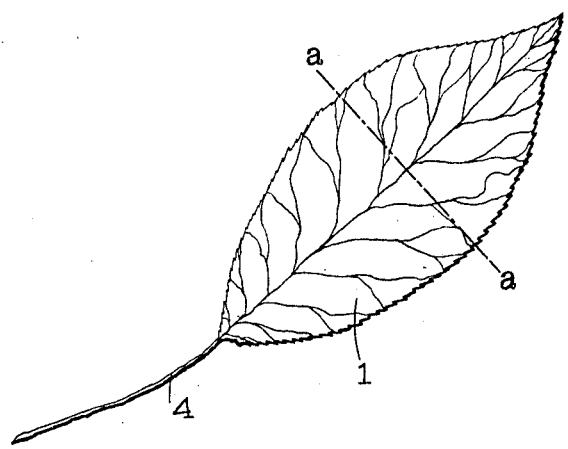
Figure 2:

Figure 1 is a face view of a leaf constructed in accordance with my invention. Fig. 2 is a section through the leaf shown in Fig. 1 on line *a a*.

In referring to the drawings in detail like numerals designate like parts.

In Fig. 1 a leaf is shown which may form the leaves of any flower or a separate leaf arranged on a branch or stem. This leaf consists of a thin comparatively cheap and very flexible facing material 1 such as velveteen, a stiffening backing of suitable material preferably tissue paper 2 and a thin layer of paste 3 between the facing and backing materials which serves to cement the two materials together and also to stiffen the completed leaf sufficiently to present the appearance of a natural leaf. In fact this artificial leaf greatly resembles the natural leaf as the velveteen has the soft glossy and velvety surface of the face of a flower leaf while the tissue gives a dull finish to the back of the leaf. In particular the leaf shown represents one of the leaves of an artificial flower made up to imitate a poinsettia or Christmas flower which is partly composed of large scarlet or red colored leaves.

The method of construction of this improved leaf is as follows: The velveteen is cut in suitable sizes dipped in the desired color and then hung on a frame to dry. After it is dried it is coated on the back with a paste preferably made of starch and water. In preparing this paste a suitable proportion of starch is mixed with sufficient cold water to soften it and this mixture is then mixed with boiling water which breaks and cooks the particles of starch producing a fairly thick adhesive paste. The paste is placed on the back of the velveteen by a brush and the tissue sheet is pressed against the same and cemented in place by the paste. The leaf blank after the paste has dried is cut to the desired shape by a suitable die or other similar tool which also imprints the impression of the veins running through a leaf to the same. A stem 4 of wire covered with green tissue paper or other suitable material is secured by cement to the back of the tissue backing.

The principal advantages of this invention are that a perfect imitation of both the face and the back of the natural leaf is secured and that comparatively thin, light, soft and inexpensive material may be used, owing to the manner of forming the leaf in two cemented-together sections.

The special advantage of using paper as a stiffener in the production of artificial flowers is that the paper performs a dual function of holding the fabric against curling and at the same time giving a finished effect to the fabric which is similar to the waxy appearance of the back of leaves or petals of flowers. The use of fabric such as buckram or muslin while it would stiffen the material would not give the glossy effect that the paper gives and it would be without effect in the art of artificial flower making. Aside from the dual function of the paper, it is inexpensive compared with the use of muslin or buckram.

I claim—

An artificial leaf or petal comprising flexible facing material having pile capable of maintaining ornamental impression on its surface and a stiffener consisting of tissue paper with a layer of adhesive between the tissue paper and the facing material.

EUGENE ANTONUCCI.

Witnesses:
L. M. SANGSTER,
GEORGE A. NEUBAUER.